United States Patent
Röckle et al.

(10) Patent No.: US 10,634,617 B2
(45) Date of Patent: Apr. 28, 2020

(54) INSTALLATION FOR THE OPTICAL INSPECTION OF SURFACE REGIONS OF OBJECTS

(71) Applicant: EISENMANN SE, Böblingen (DE)

(72) Inventors: Jürgen Röckle, Magstadt (DE); Jan Reiner Hammermann, Kirchheim/Teck (DE); Axel Halbmeyer, Bölingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 15/741,108

(22) PCT Filed: Jun. 14, 2016

(86) PCT No.: PCT/EP2016/063585
§ 371 (c)(1),
(2) Date: Dec. 29, 2017

(87) PCT Pub. No.: WO2017/001185
PCT Pub. Date: Jan. 5, 2017

(65) Prior Publication Data
US 2018/0195972 A1    Jul. 12, 2018

(30) Foreign Application Priority Data

Jul. 2, 2015 (DE) .................. 10 2015 008 409

(51) Int. Cl.
*G01M 11/08* (2006.01)
*G01N 21/88* (2006.01)
(Continued)

(52) U.S. Cl.
CPC ....... *G01N 21/8806* (2013.01); *G01M 11/081* (2013.01); *G01M 17/007* (2013.01);
(Continued)

(58) Field of Classification Search
CPC . G01J 3/46; G01J 3/506; G01N 21/88; G01N 21/55; G01N 21/57; G01N 21/8803;
(Continued)

(56) References Cited

U.S. PATENT DOCUMENTS 4,918,321 A    4/1990 Klenk et al.
5,237,404 A *  8/1993 Tanaka ................ G01B 11/303
                                                    348/128
(Continued)

FOREIGN PATENT DOCUMENTS

CN    1871506    11/2006
CN    102282592   12/2011
(Continued)

OTHER PUBLICATIONS

Search Report dated Sep. 12, 2016, International Search Report cited in the corresponding PCT/EP2016/063585, dated Sep. 12, 2016; 6 pages.
(Continued)

*Primary Examiner* — Hoa Q Pham
(74) *Attorney, Agent, or Firm* — Lempia Summerfield Katz LLC

(57) ABSTRACT

An installation for the optical inspection of surface regions of objects, such as painted vehicle bodies, includes a test light device, by which objects located in a test region can be irradiated with a test light and by which a test pattern can be generated on the surface region. A lighting system includes a plurality of lighting units, by which test light can be emitted. The light intensity of the test light or both the color of light and the light intensity of the test light can be optionally adjusted by the lighting units.

16 Claims, 9 Drawing Sheets

(51) Int. Cl.
*G01M 17/007* (2006.01)
*G01N 21/89* (2006.01)

(52) U.S. Cl.
CPC ..... *G01N 21/8803* (2013.01); *G01N 21/8901* (2013.01); *G01N 2021/8835* (2013.01); *G01N 2021/8845* (2013.01)

(58) Field of Classification Search
CPC ....... G01N 21/8806; G01N 2021/8835; G01N 2021/8908; G01N 33/32; G01B 11/303; G01B 11/306; G06T 7/90
USPC ................ 356/237.1–237.5, 445–448, 600
See application file for complete search history.

(56) References Cited

U.S. PATENT DOCUMENTS

| | | | |
|---|---|---|---|
| 5,367,378 A * | 11/1994 | Harding | G01B 11/306 356/613 |
| 5,414,518 A * | 5/1995 | Yazejian | G01N 21/8803 356/237.2 |
| 5,636,024 A | 6/1997 | Crookham et al. | |
| 5,686,987 A * | 11/1997 | Hewitt | G01N 21/8803 356/237.1 |
| 5,726,705 A | 3/1998 | Imanishi et al. | |
| 5,822,054 A * | 10/1998 | Coulthard | G01N 21/8803 356/237.2 |
| 5,911,599 A | 6/1999 | Masuda | |
| 6,266,138 B1 * | 7/2001 | Keshavmurthy | G01B 11/303 356/237.2 |
| 6,532,066 B1 * | 3/2003 | Filev | G01N 21/8422 348/92 |
| 8,218,852 B2 * | 7/2012 | Cork | B29C 73/06 156/58 |
| 8,472,025 B2 | 6/2013 | Reinhard | |
| 8,792,094 B2 | 7/2014 | Balducci | |
| 9,007,458 B2 | 4/2015 | Terreno et al. | |
| 10,401,302 B2 * | 9/2019 | Rockle | G01N 21/8914 |
| 2007/0206182 A1 * | 9/2007 | Ishikawa | G01N 21/8806 356/237.2 |
| 2010/0091272 A1 | 4/2010 | Asada | |
| 2011/0273717 A1 | 11/2011 | Reinhard | |
| 2012/0268733 A1 | 10/2012 | Balducci | |
| 2013/0057678 A1 | 3/2013 | Prior Carrillo et al. | |
| 2016/0377416 A1 * | 12/2016 | Reid | G01B 11/2513 356/612 |
| 2017/0108443 A1 * | 4/2017 | Kurihara | G01N 21/8806 |

FOREIGN PATENT DOCUMENTS

| | | |
|---|---|---|
| CN | 102725625 | 10/2012 |
| DE | 3418317 | 1/1985 |
| DE | 3712513 | 11/1988 |
| DE | 19534145 | 4/1996 |
| DE | 102005034637 | 10/2006 |
| EP | 1677098 | 7/2006 |
| EP | 1843145 | 10/2007 |
| EP | 2602763 | 6/2013 |
| GB | 2308656 | 7/1997 |
| JP | H109837 | 1/1998 |
| WO | 2014048408 | 4/2014 |
| WO | 2015080941 | 6/2015 |

OTHER PUBLICATIONS

CN Office Action dated Apr. 29, 2019, English translation of the Chinese Office Action cited in the corresponding Chinese application No. 201680038785.9; dated Apr. 29, 2019; 12 pp.

* cited by examiner

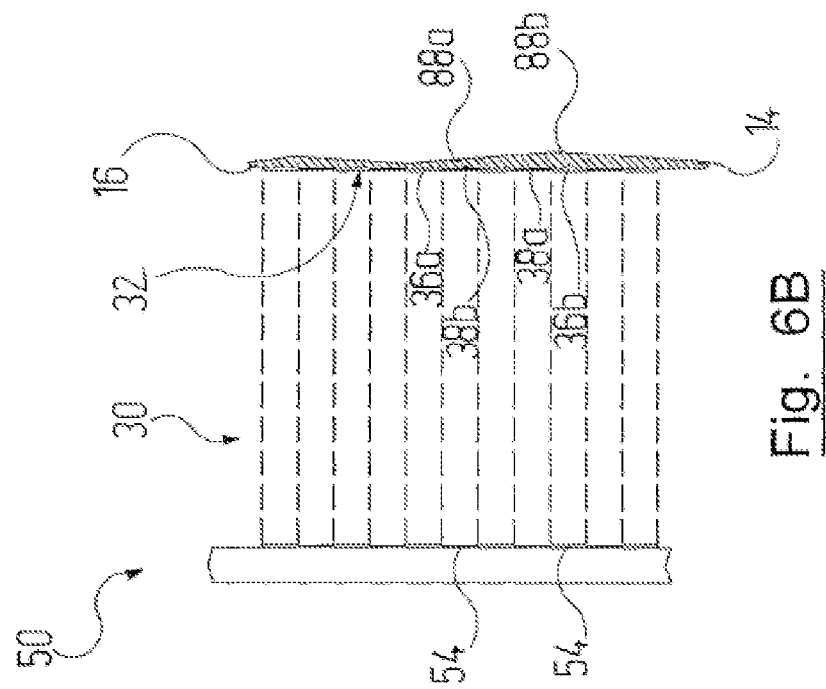
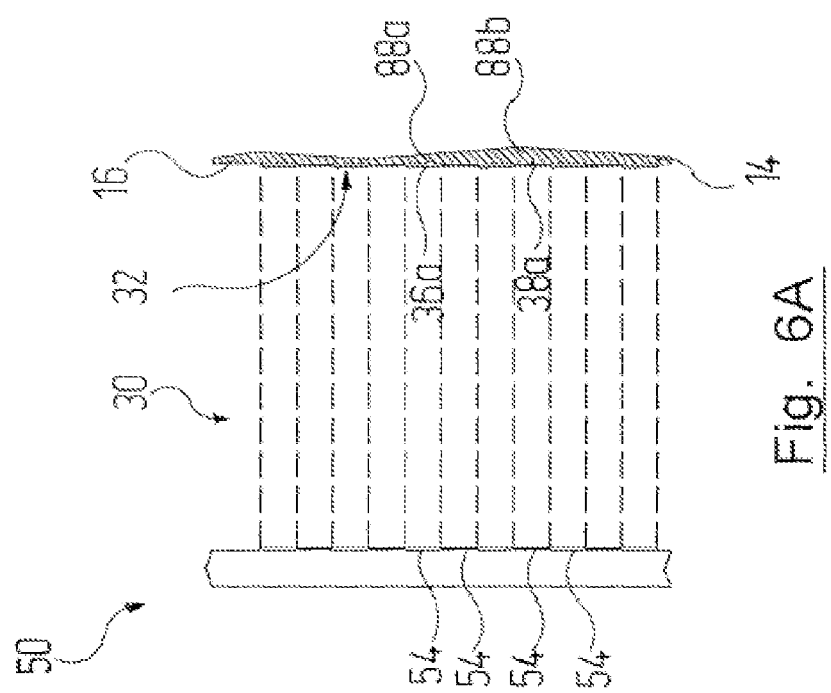

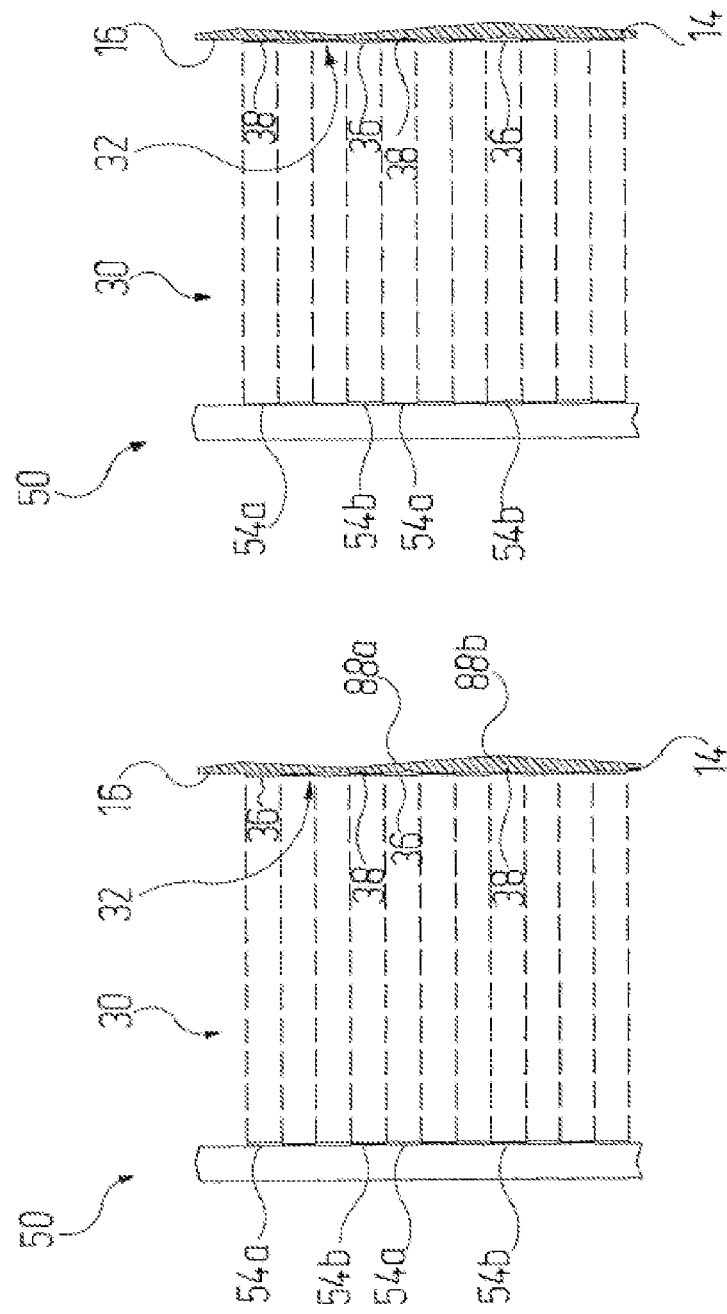

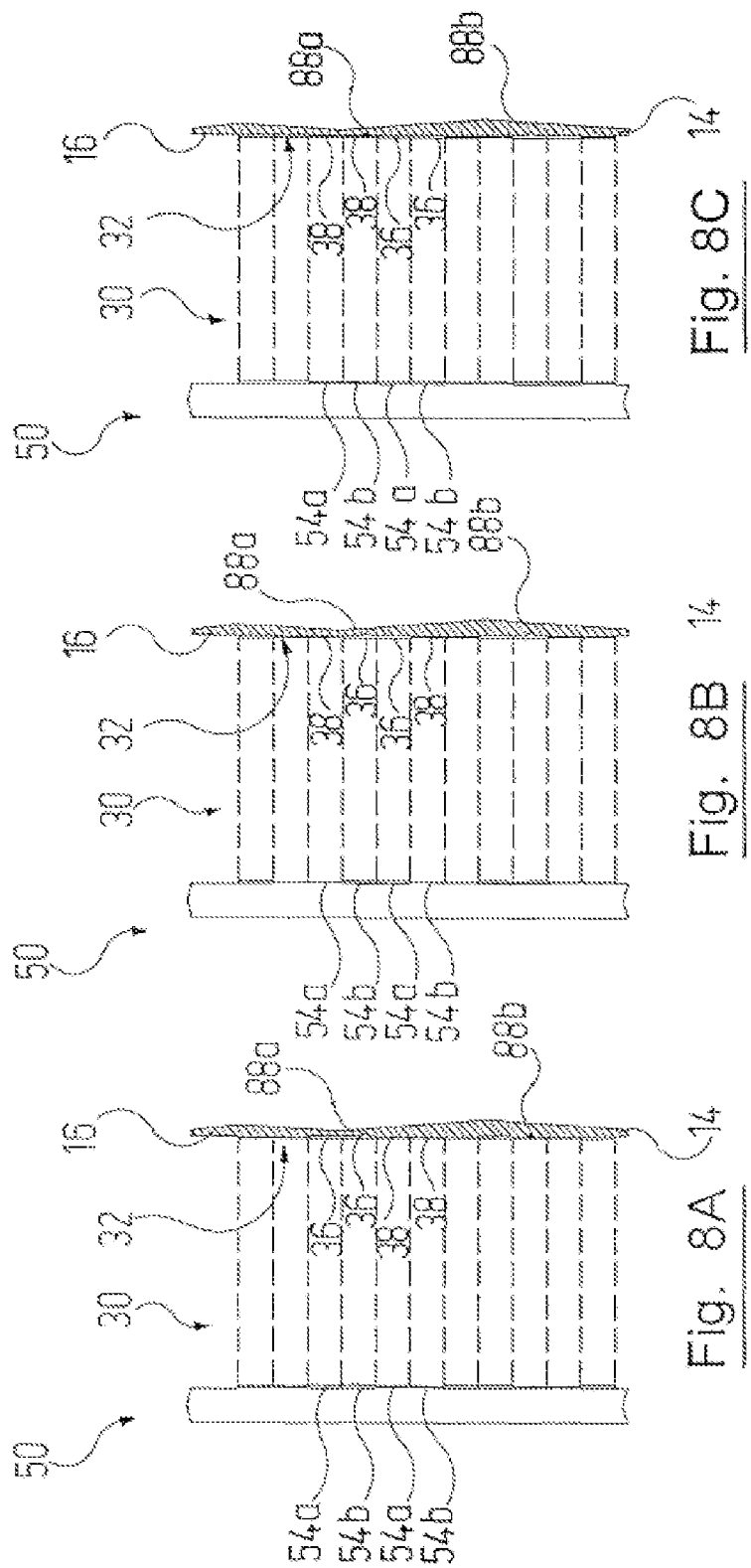

INSTALLATION FOR THE OPTICAL INSPECTION OF SURFACE REGIONS OF OBJECTS

RELATED APPLICATION DATA

This application is a U.S. national stage of and claims priority benefit to prior filed international application no. PCT/EP2016/063585, filed Jun. 14, 2016, and which claims priority to German national application no. 10 2015 008 409.7, filed Jul. 2, 2015. The entire contents of these prior filed applications are hereby incorporated by reference herein.

BACKGROUND

1. Filed of the Disclosure

The invention relates to an installation for the optical inspection of surface regions of objects, in particular painted vehicle bodies, having
a) a test-light apparatus, by means of which objects situated in a test region can be exposed to a test light and by means of which a test pattern is producible on the surface region;
b) a lighting system comprising a plurality of lighting units, by means of which test light is emittable.

Moreover, the invention relates to a lighting system for such an installation having at least one first and one second lighting device, wherein the first lighting device and the second lighting device comprise lighting units, and to a test-light module having at least one lighting unit.

2. Description of Related Art

In such installations, the surfaces of painted vehicle bodies, in particular, are tested visually in respect of their quality by inspectors. Defects in the surface lead to local distortions of the test pattern in comparison with the image thereof on an ideally defect-free surface, as a result of which a skilled inspector quickly notices surface defects that are present. There are a multiplicity of different surface defects which may occur during the painting process. Such surface defects of painted surfaces can be assigned to different categories. Purely by may of example and not exclusively, such surface defects may be present in the form of paint inclusions, wetting or extent disturbances, craters, clouds, color deviations or the like.

SUMMARY

It is an object of the invention to develop an installation of the type set forth at the outset, in which the effectiveness and efficiency of the inspection are improved over the prior art.

In an installation of the type set forth at the outset, this object is achieved by virtue of
c) the light color or both the light color and the light intensity of the test light being optionally adjustable by means of the lighting units.

The invention is based on the discovery that the visual identifiability of the test pattern for an inspector can be improved by virtue of, in particular, the light color of the test light being set depending on the color of the object. Setting the light color is also related to setting the light temperature of the test light. Depending on the color of the object, different wavelengths of the test light are absorbed or reflected, and so the eye of an observer perceives a different color than would be the case for a white surface. Under certain circumstances, the contrast of the test pattern on the surface may suffer as a result thereof. This can be counteracted by an appropriate modification of the light color of the test light. The additionally possible adjustment of the light intensity may be helpful, for example, if the ambient brightness changes.

In order to achieve a largely encompassing illumination of the object, it is expedient if lighting units are
a) comprised by a side lighting device in such a way that they flank the test region or
b) comprised by two side lighting devices in such a way that they flank the test region on both sides.

Here, it is advantageous if the lighting units of a side lighting device are arranged in at least two rows which extend above one another in the vertical direction.

In order also to be able to effectively inspect upper regions of an object, moreover, lighting units are preferably comprised by a ceiling lighting device in such a way that they are arranged above the test region.

Here, the lighting units of the ceiling lighting device are preferably arranged in a row or in two rows arranged next to one another and in two rows flanking the latter, which are arranged in a portal-type fashion above the test region.

If the lighting units of the flanking rows are inclined in relation to a horizontal plane, it is possible, for example, to cover the roof rails of a vehicle body well with a test pattern.

Preferably, the lighting units are respectively embodied as a lighting panel with a plurality of lighting elements.

A good resolution of the test pattern can be achieved if at least one lighting element comprises a plurality of lighting means.

Particularly preferably, at least one of the lighting means present is an LED lighting means.

Preferably, the lighting means comprises a white light-emitting diode and a yellow light-emitting diode.

In order to significantly increase the color spectrum, it is expedient if the lighting means moreover comprises an RGB LED.

In order to localize surface defects, it is advantageous, depending on the space conditions, if means are present, by means of which the test pattern and the object are movable relative to one another.

Preferably, a conveyor system is present to this end, by means of which the objects are movable.

In order to be able to inspect the object without having to move the latter to this end, it is advantageous if the lighting units are configured in such a way that they are actuatable by a control system in such a way that a test pattern is producible, said test pattern moving over or moving on a surface region which remains stationary.

It is expedient if a stripe pattern made of alternately arranged bright stripes and dark stripes is producible as a test pattern.

In view of the lighting system, it is expedient if the lighting units are of identical construction. This simplifies servicing and the inspection can also be continued efficiently in the case of faults.

In view of a test-light module, it is advantageous if the test-light module comprises at least one connection element for at least one line for operating means such that a first test-light module can be connected from an operational and control point of view to a second test-light module. Hence, a test chamber can be effectively constructed and modified where necessary.

Here, it is advantageous if it forms a portal and it is a test-light portal module.

BRIEF DESCRIPTION OF THE DRAWINGS

Below, exemplary embodiments of the invention are explained in more detail on the basis of the figures. In these:

FIGS. 6A and 6B schematically show the illumination of a surface region of an object by way of a stripe test pattern during two test phases, between which the object is moved in relation to the lighting units in order to generate a relative movement between the stripe test pattern and the object;

FIGS. 7A and 7B schematically show the illumination of a surface region of an object by way of a stripe test pattern during two test phases, in which lighting elements are actuated differently in order to produce a relative movement between the stripe test pattern and the object;

FIGS. 8A, 8B, 8C schematically show the illumination of a surface region of an object by way of a stripe test pattern, wherein a respective test-light stripe is formed from two partial stripes that are producible independently of one another.

DETAILED DESCRIPTION

Figure 1:
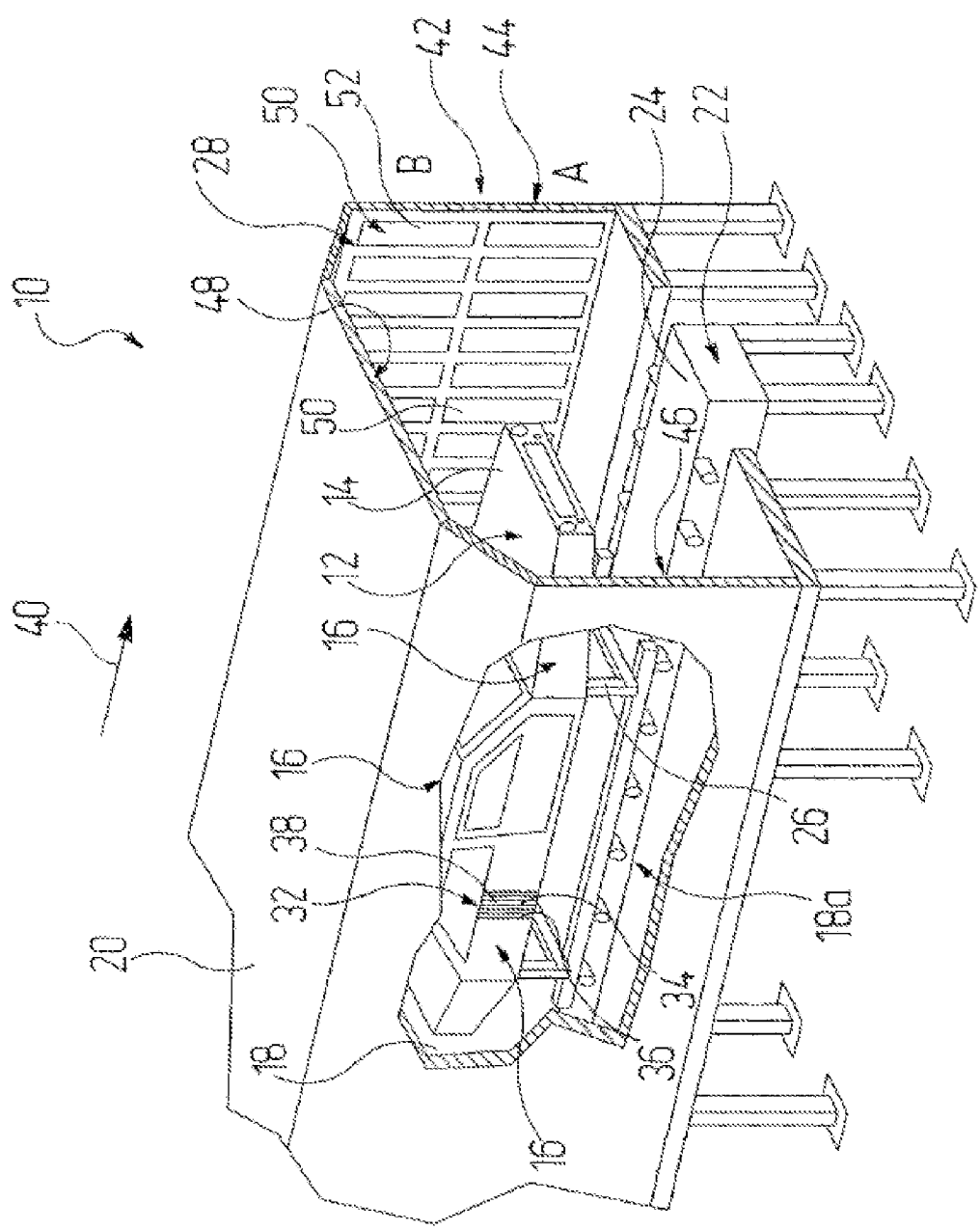
FIG. 1 shows a perspective view of an installation for optical and visual inspection of surface regions of objects, in which objects are conveyed through a test chamber by means of a conveyor system, in which the objects can be irradiated with a test light by a test-light apparatus, with a test pattern being produced on the surface.

Initially, reference is made to FIGS. 1 to 4. There, an installation for optical inspection of surface regions of objects 12 is denoted by 10 overall. In the present case, vehicle bodies 14 are shown in an exemplary manner as objects 12; some surface regions to be inspected are denoted by 16. During the testing process, the entire surface of the object 12 is tested by virtue of checking individual surface regions 16 in succession.

As explained at the outset, painted vehicle bodies 14 are guided through the installation 10 in order to inspect the quality of the paint job visually by an inspector. To this end, the installation comprises a test chamber 18 with a housing 20, through which the vehicle bodies 14 can be guided with the aid of a conveyor system 22. In the present exemplary embodiments, the conveyor system 22 comprises a roller conveyor 24, on which so-called conveyor skids 26 can be transported, the latter, expressed in general terms, forming a carrying structure on which, in turn, the vehicle bodies 14 are fastened. Such conveyor systems are known per se. Alternatively, use may also be made of all other suitable and known conveyor systems, such as e.g. ground-based rail systems or overhead track systems.

A test-light apparatus 28, by means of which the vehicle bodies 14 can be irradiated with a test light 30, is housed in the test chamber 18, which is often also referred to as a light tunnel, wherein a test pattern 32 is produced on the surface region 16 when the vehicle body 14 is situated in the test chamber 18. The vehicle body 14 then defines a test region 18a in the test chamber 18 which is intended to be captured, at least in regions, by the test light 30. As will still be rendered more lucidly below, the vehicle body 14 can be moved during, or for, the test process where necessary such that all positions of the vehicle body 14 may define the test region 18a in the test chamber 18.

In the present exemplary embodiments, the test pattern 32 is a stripe pattern 34 in which bright stripes 36 and dark stripes 38, which are arranged alternately and parallel to one another, are present. In the present exemplary embodiments, the bright and dark stripes 36, extend in the direction perpendicular to the transport direction 40, in which the vehicle bodies 14 are conveyed through the test chamber 18 and which is only elucidated in FIG. 1.

In order to produce the test light 30 and the test pattern 32, the test-light apparatus 28 comprises a lighting system 42 which in turn comprises two side lighting devices 44, 46 and a ceiling lighting device 48. The side lighting devices 44, 46 have an identical structure, which is why only the side lighting device is discussed below. It comprises a plurality of lighting units 50 which are embodied as a lighting panel 52 and in turn are constructed from a plurality of lighting elements 54 in each case. In the present exemplary embodiment, the lighting panels 52 are arranged in two rows A and B which extend over one another in the vertical direction. However, other arrangements also can be readily realized.

Here, the lighting units 50 are comprised by the two side lighting devices 44, 46 in such a way that they flank the test region 18a for a vehicle body 14 on both sides. Consequently, the side lighting devices 44, 46 are arranged on both sides of the conveyor system 22.

Figure 3:
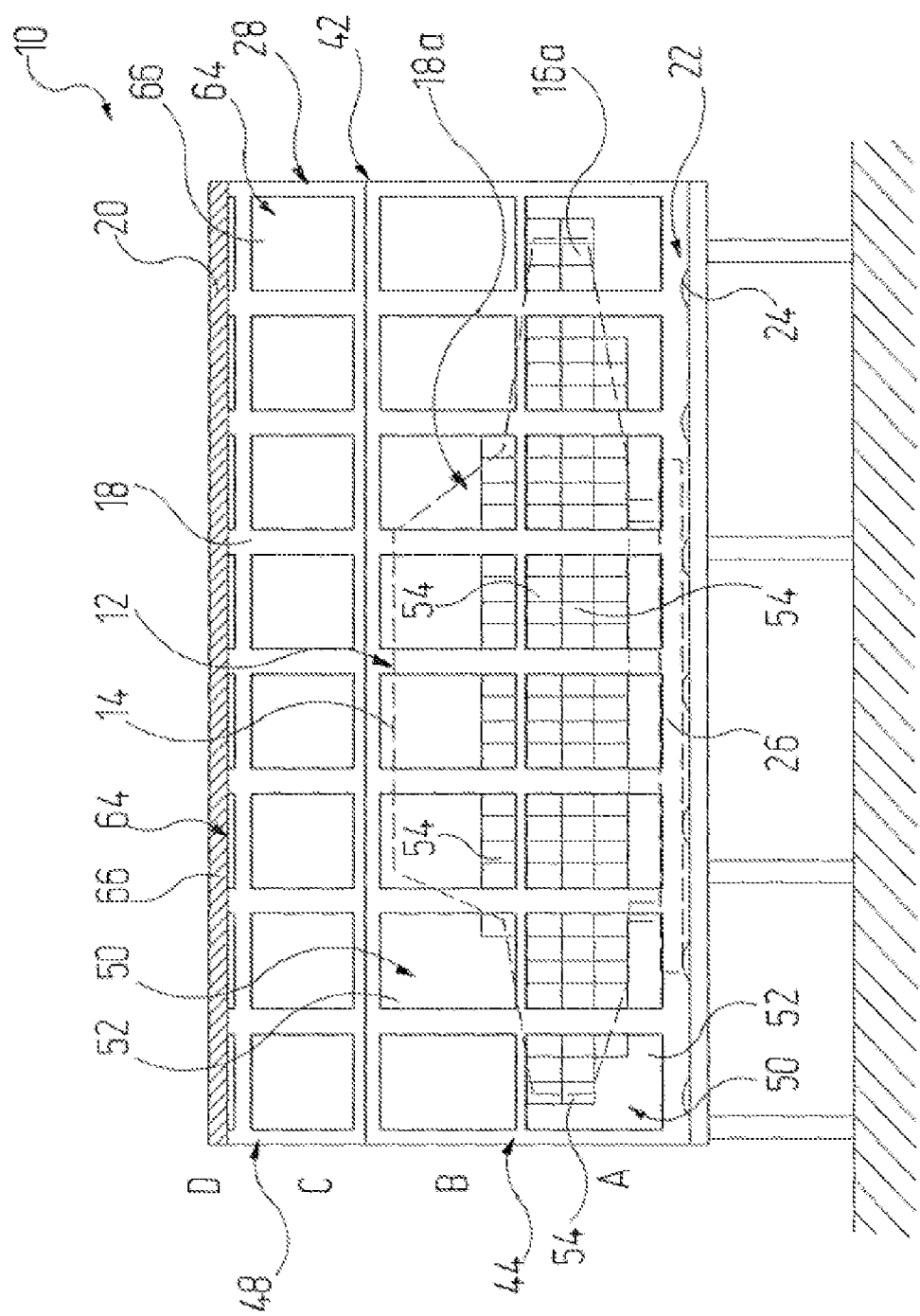
FIG. 3 shows a longitudinal section of the installation of FIG. 1, wherein individual lighting elements of certain lighting units of the side lighting device are activated.
Figure 4:
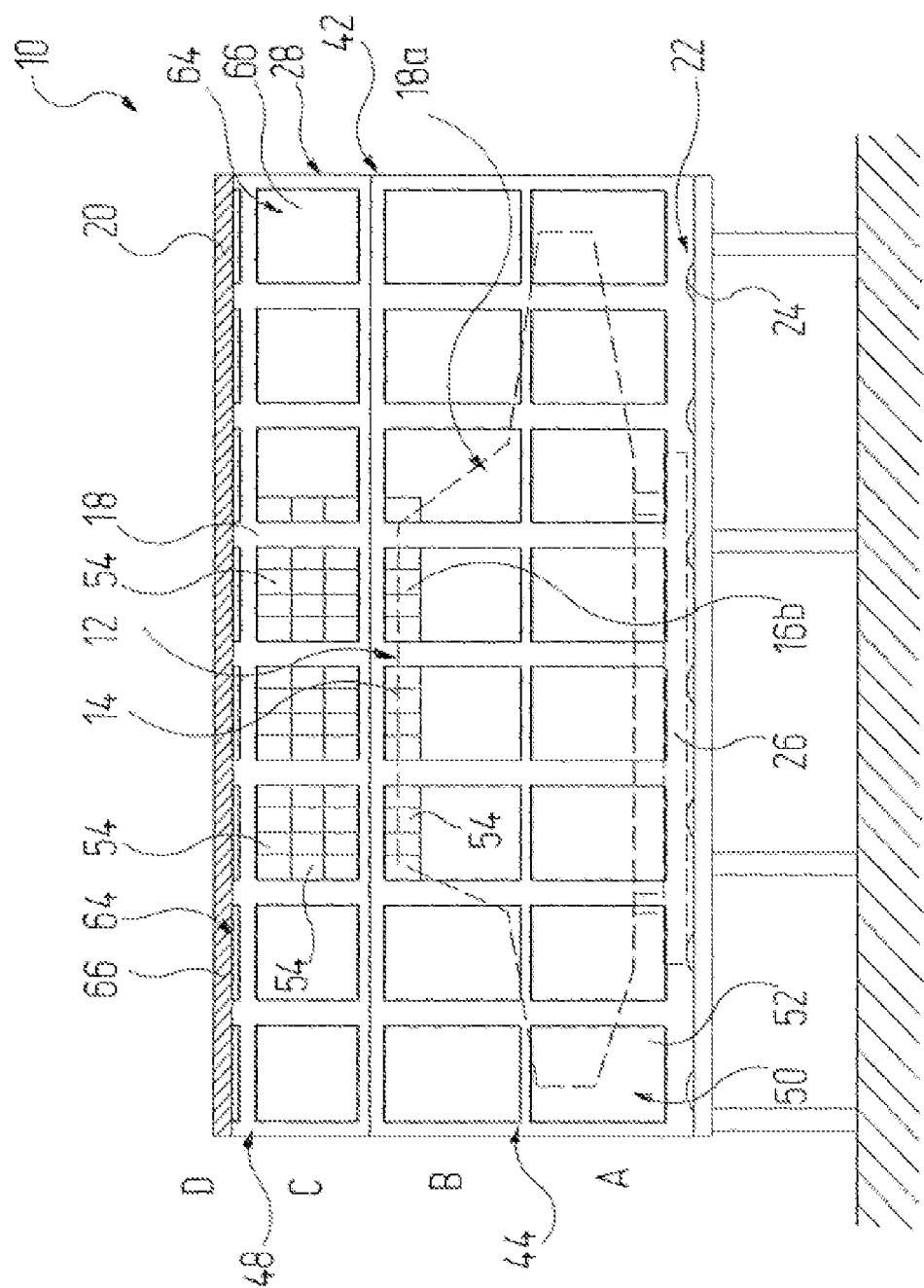
FIG. 4 shows a longitudinal section corresponding to FIG. 3 of the installation of FIG. 1, wherein individual lighting elements of certain lighting units of the side lighting device and of a ceiling lighting device are activated, said ceiling lighting device in turn comprising a plurality of lighting units respectively constructed from a plurality of lighting elements.
Figure 5:
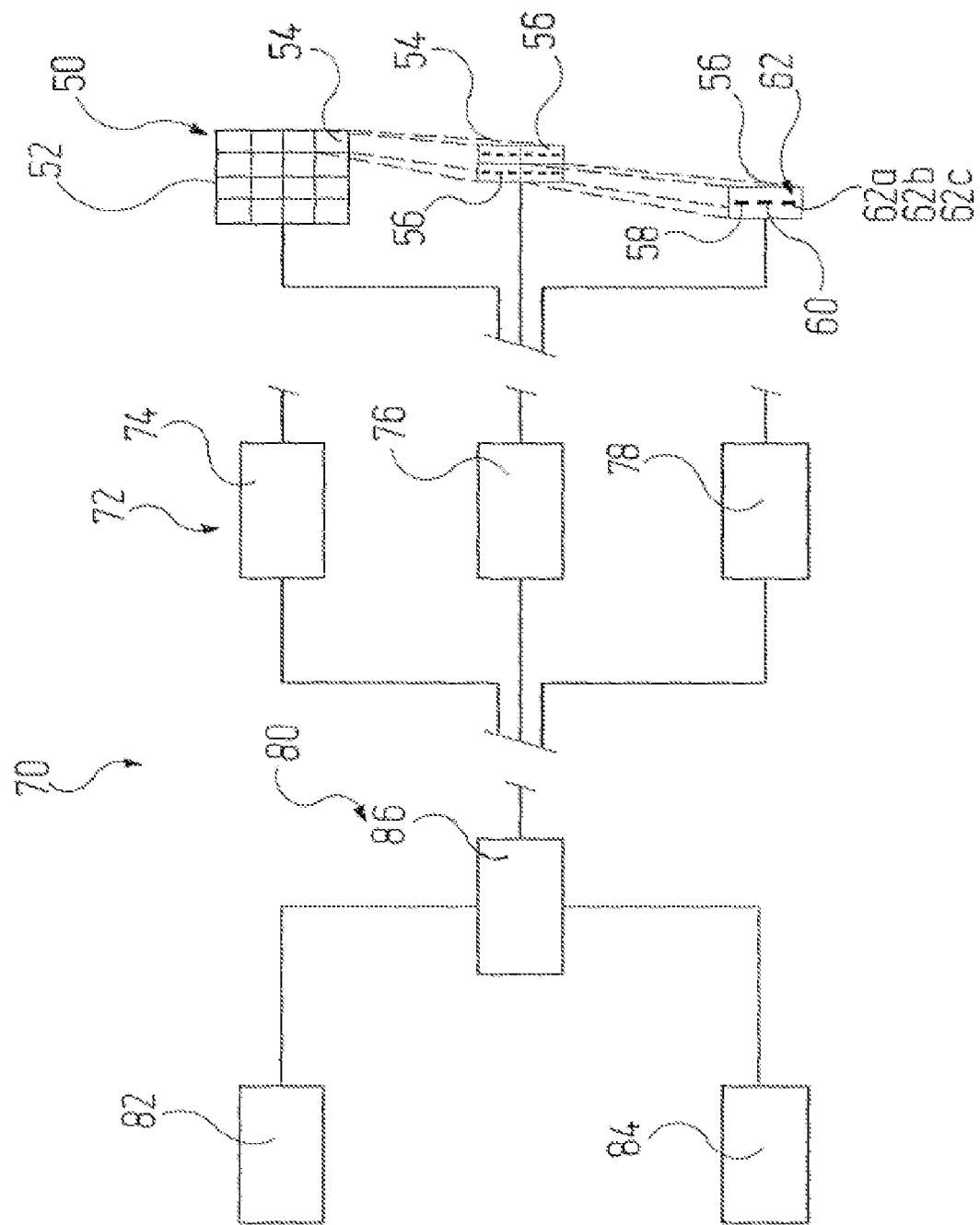
FIG. 5 schematically shows a control layout for the selective actuation of individual lighting units and/or individual lighting elements and/or individual lighting means.

In the present exemplary embodiment, each lighting panel 52 of the side lighting device 44 comprises a number of 16 lighting elements 54, which are arranged in a 4×4 matrix; this can be identified from FIGS. 3 to 5. Here, the lighting panels 52 are aligned vertically.

FIG. 5, which will be discussed again in detail below, shows that each lighting element 54 in turn is constructed from a plurality of lighting means 56, wherein four lighting means 56 are present in a 2×2 matrix for each lighting element 54 in the present exemplary embodiment.

Each lighting means 56 is an LED lighting means with, in each case, a white light-emitting diode 58, a yellow light-emitting diode 60 and an RGB LED 62, the latter in turn comprising a red light-emitting diode 62a, a green light-emitting diode 62b and a blue light-emitting diode 62, which cannot be identified as individual diodes.

In practice, the white light-emitting diodes 58 have a light temperature of 6500 Kelvin and produce a so-called daylight white, whereas the yellow light-emitting diodes 60 have a light temperature of 2700 Kelvin and produce a so-called warm white. If the white light-emitting diode 58 and the yellow light-emitting diode 60 of a lighting means 56 emit light in equal proportions, the lighting means 56 produces light with a light temperature of 4000 Kelvin and hence a so-called cold white or neutral white. The human eye finds this light temperature less tiring.

The ceiling lighting device 48 has a corresponding construction and likewise comprises a plurality of lighting units which are denoted by 64 and respectively form a lighting panel 66. The lighting units 64 are comprised by the ceiling lighting device 48 in such a way that they are arranged above the test region 18a for a vehicle body 14.

Figure 2:
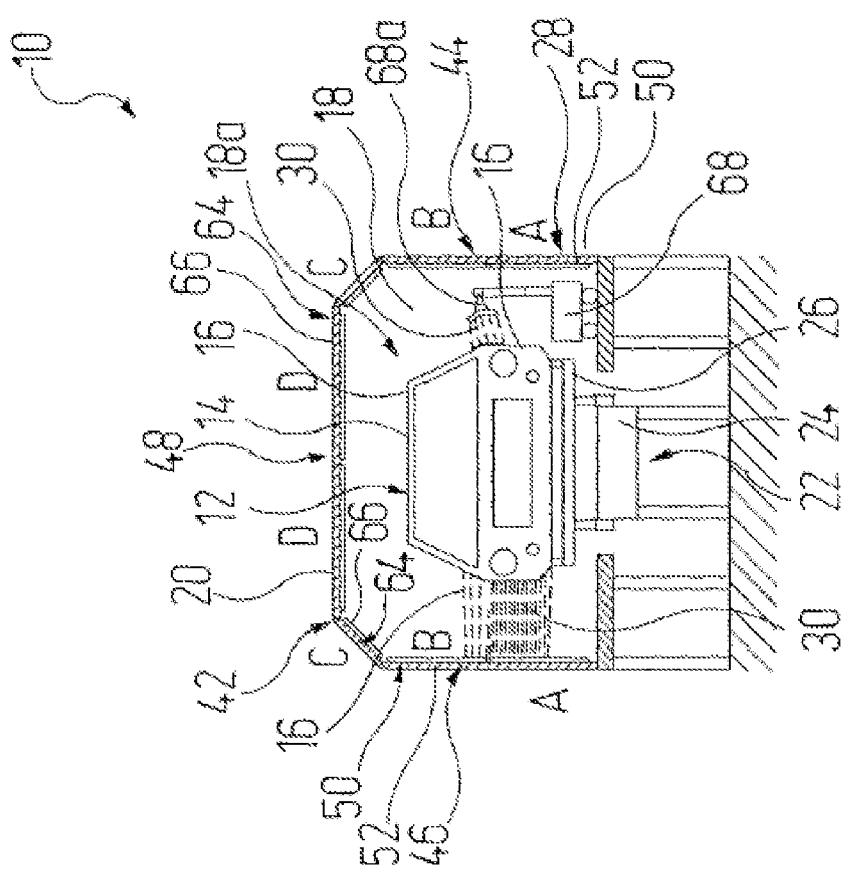
FIG. 2 shows a frontal view of the installation of FIG. 1, wherein a side lighting device is shown in an activated state, said side lighting device laterally flanking the objects and comprising a plurality of lighting units respectively constructed from a plurality of lighting elements, and wherein, moreover, a mobile lighting device of the test-light apparatus is shown.

The ceiling lighting device 48 comprises two rows D arranged next to one another and two rows C that flank the latter, with lighting panels 66 which are arranged in a portal-like manner above the vehicle bodies 14 or the test region 18a and only denoted in FIG. 2. There also may be a single central row D only. Here, the lighting panels 66 of the rows D are aligned horizontally and radiate downward. By contrast, the lighting panels 66 of the rows C are inclined in relation to a horizontal plane and respectively arranged between a row B of the respective side lighting devices 46 and the rows D of the ceiling lighting device 48.

As elucidated in FIGS. 3 and 4, the lighting elements 54 of the individual lighting panels 52 can be activated and deactivated in a targeted manner and independently of the remaining lighting elements 54 and/or lighting panels. As a result of this, it is possible to selectively irradiate certain surface regions 16 of the vehicle bodies 14 with test light 30 and the test pattern 32. FIG. 3 shows an irradiation of a door surface region 16a level with the door of the vehicle body 14, with the window regions being omitted. By contrast, FIG. 5 shows the targeted irradiation of a roof surface region 16b of the vehicle body 14, wherein, on account of the illustration, only the lighting elements 54 of specific lighting panels 66 of a row C are identifiable as activated.

Those lighting panels 52 that are not required for producing the test pattern 32 can be used for the general illumination of the test chamber 18, should this be required. To this end, the light intensity can be selectively reduced or increased to the required amount in individual lighting elements 54 or else only in lighting means 56. As a result of this, it is possible to dispense with a complementary additional illumination for the main illumination of the test chamber 18, which is otherwise ensured by, for example, lighting units in the floor of the test chamber 18.

In a complementary manner, the test-light apparatus 28 may also comprise one or more mobile lighting devices 68, with only FIG. 2 showing such a mobile lighting device 68. The latter likewise comprises one or more lighting units with lighting panels, which have a structure as explained above and which, for reasons of clarity, have not been provided with a dedicated reference sign and which may also be integrated in a movable lighting head 68a.

Such a mobile lighting device 68 can also be used at a different location to the test chamber 18, for example to be able to carry out an inspection if, independently of the actual test process, concerns arise in relation to the the surface condition.

With the aid of the LED lighting means 56, it is possible now to match the lighting system 42, and therein the test light 30 and the test pattern 32, in a targeted manner to the vehicle body 14 to be tested and, in particular, to the paint type and paint color thereof. Here, the intensity and/or the color of the test pattern 32 or else of individual bright and dark stripes 36 and 38 can be selected differently depending on the paint type and paint color in order to take account of the light absorption behavior of the paint such that a test pattern 32, which is identifiable by an inspector to the best possible extent, can be produced on the vehicle body 14. Consequently, an offset, i.e. a fine adjustment, of the lighting effect of the individual lighting means 56 is also possible, said offset being matched to the wishes of a certain worker such that it is possible to emit a subjectively ideally comfortable test light 30 for the worker. By way of example, when a certain worker logs into a certain zone of the test chamber 18, the installation 10 is able to produce a test light 30 matched to the worker for their work zone.

Expressed in general, the light color or both the light color and the light intensity of the test light 30 can be selectively set by means of the lighting units 50, 64. As mentioned at the outset, a change in the light intensity may possibly also suffice, but the lighting units 50, 64 always provide the option of modifying the light color.

Depending on the type of the defect on the surface to be identified, it is particularly expedient if the light temperature and the intensity of the LED lighting means 56 are adaptable to the properties of the surface of the vehicle body 14, such as e.g. its color and gloss level, in a from 2700 Kelvin to 6500 Kelvin. Specific surface defects can also be particularly highlighted by a defect-specific adaptation of only the RGB LED 62, which thus increases the efficiency and effectiveness of the test process.

The most common defects after a paint job are inclusions, for example dust inclusions, and wetting defects. These defects appear to be relatively dark in a bright stripe 36 to the observer, whereas they stand out as relatively bright in a dark stripe 38. Such surface defects can be identified well by the change in the optical impression at the transition from a bright stripe 36 to a dark stripe 38, in particular.

The surface can also be examined in respect of color differences; by way of example, a comparison of the actual body with attachments made of plastic or the transition from the external to the internal paint is of interest here. Here, the visual impression in the case of hue deviations can be amplified by a specific actuation of, in particular, the RGB LED 62 by virtue of the light emitted by the RGB LED 62 being specifically adapted to the color of the vehicle body 14 to be examined and therefore to the absorption behavior of the applied paint.

Moreover, the LEDs 58, 60 and 62, and here in particular the RGB LEDs 62, are used to image information, identifiable on the vehicle body 14 by the workers, in the form of a so-called tracking light. The tracking light can indicate information for characterizing specific vehicle bodies 14 or the processing state of the vehicle bodies 14. Thus, for example, a model vehicle body with a standardized surface can be used to check the lighting devices 44, 46, 48 in a certain section of the test chamber 18. Once the check has been completed, e.g. a red bar is produced on this model vehicle body such that workers situated in downstream regions of the test chamber 18 know that no check needs to be carried out in this case. Optionally, it is also possible to mark individual already identified surface defects with the aid of the RGB LEDs 62 in particular. In all cases, the image produced on the surface tracks the vehicle body 14 when the latter is conveyed through the test chamber 18 by means of the conveyor system 22.

The LEDs 58, 60, 62 can also image location-related information on the vehicle bodies 14, which only need to be observed by the workers in one or more certain sections of the test chamber 18. Such location-related information includes, for example, information about a stop for complementary quality control, an effectuated emergency stop procedure, about faults of the installation or the like.

In addition to these adjustable lighting units 50, 64, the lighting system 42 may also comprise further lighting units, by means of which it is only possible to produce a non-modifiable test pattern or possibly test patterns with different intensities but not with different colors.

To this end, the test-light apparatus 28 comprises a control system 70, elucidated in FIG. 5, with a control device 72 which in turn comprises control units 74, 76 and 78 for the side lighting devices 44, 46 and the ceiling lighting device 48. With the aid of the control units 74, 76, 78, it is possible to activate or deactivate the lighting elements 54 of the individual lighting units 50 of both the side lighting devices 44, 46 and the ceiling lighting device 48, wherein the available LED lighting means 58, and specifically the available light-emitting diodes 60*a*, 60*b*, 60*c* in the present exemplary embodiment, can be selectively actuated. In a complementary manner, the control units 74, 76, 78 are designed in such a way that the lighting panels 52 or the lighting elements 54 or the lighting means 56 also can be actuated as a respective unit, without it being necessary to actuate the individual light-emitting diodes 60*a*, 60*b*, 60*c* separately in each case to this end.

The control device 72 cooperates with a control device 80 and a memory device 82, in which the parameters of various test-light programs are stored as a database, said test-light programs being intended to be carried out for specific combinations of body types/surface coatings/colors of the vehicle bodies 14. The control device 80 comprises a sensor device 84 which, in practice, is arranged at the entrance to the test chamber 18 and with the help of which the body type, the type of surface coating and the color thereof are captured when the vehicle body 14 enters. It is also possible to dispense with such a sensor device 84 and the required data can also be predetermined in an overarching manner from the control device 72. Moreover, a worker may also define the vehicle body 14 to be tested and the parameters thereof manually.

The data obtained thus is transmitted to an interface unit 86 which, on the basis of the data, reads the corresponding test-light program from the memory device 82 and forwards said test-light program to the control units 74, 76, 78 such that the desired test-light program can be carried out.

FIGS. 6A, 6B, 7A, 7B and 8A, 8B, 8C now respectively elucidate a surface region 16 of the vehicle body 14 with two surface defects 88*a*, 88*b*, said surface region being illuminated by the test pattern 32. In these figures, lighting elements 54 of lighting units 50 of the side lighting device 44 are shown in an exemplary manner, with lighting units 50 not being shown separately. Here, those lighting elements 54 which produce a bright stripe 36 of the test pattern 32 are white and those lighting elements 54 which produce a dark stripe 38 of the test pattern 32 are shown in black. The last-mentioned lighting elements 54 for the dark stripes 38 may be deactivated or may produce a darker light in relation to the lighting elements 54 for the bright stripes 36 with a lower intensity or optionally also only a darker hue or a different light color.

In order to inspect the surface quality of the painted vehicle bodies 14, means which can be used to move the test pattern 32 and the vehicle body 14 relative to one another are present. In surface regions of the vehicle body 14 with irregularities—here in the form of the surface defects 88*a*, 88*b*—there is a type of distortion of the test pattern 32 in comparison with an ideal surface, which is particularly noticeable to an observer as a result of the movement. FIGS. 6A, 6B, 7A, 7B and 8A, 8B, 8C now elucidate various variants for how the test pattern 32 and such a relative movement between test pattern 32 and vehicle body 14 can be produced.

FIGS. 6A and 6B show a variant in which the vehicle bodies 14 are moved past the lighting panels 52, with the actuation of the lighting elements 54 remaining unchanged. In this case, the control system 70 cooperates with the conveyor system 22 and actuates the latter in such a way that the vehicle body 14 is moved accordingly. In the process, a stationary test pattern is produced. FIG. 6A shows a phase of the test process during which the surface defect 86*a* is situated in the region of a bright stripe 36*a* and the surface defect 86*b* is situated in the region of a dark stripe 38*a*. By contrast, FIG. 6B shows a phase of the test process in which the surface defect 88*a* is situated in the region of a dark stripe 38*b* adjacent to the bright stripe 36*a*. There, the surface defect 88*b* is in the region of a bright stripe 36*b* which is produced next to the dark stripe 38*a*. An inspector can identify the aforementioned pattern distortions at the transition of the surface defects 88*a*, 88*b* from the bright stripe 36*a* or from the dark stripe 38*a* to the dark stripe 38*b* and to the bright stripe 36*a*, respectively, and can localize the surface defects 88*a*, 88*b* in the surface region 16. If use is made of a mobile lighting device 68, the mobile lighting device 68 may also be moved in relation to the vehicle body 14 which remains stationary.

FIGS. 7A and 7B show a variant in which both the lighting units 50 with the lighting elements 54 and the vehicle body 14 remain stationary in space. Instead, a test pattern 32 which moves over or on the surface region 16 is produced. For this purpose, the lighting units 50 and/or the lighting elements 54 thereof and/or the associated lighting means 56 are actuated in groups or separately. As elucidated by FIG. 7A, lighting elements 54*a* initially produce a bright stripe 36 and lighting elements 54*b* initially produce a dark stripe 38. Then, the lighting elements 54 are actuated in such a way that the lighting elements 54*a* produce a dark stripe 38 and the lighting elements 54*b* produce a bright stripe 36. Here too, the surface defects 88*a*, 88*b* are initially situated in a bright stripe 36 or in a dark stripe 38 (FIG. 7A) and then in a dark stripe 38 or in a bright stripe 36 (FIG. 7B), respectively, as a result of which an inspector can perceive the arising distortions in the test pattern and can localize the surface defects 88*a*, 88*b*.

In the procedure elucidated in FIGS. 7A and 7B, each bright stripe 36 and each dark stripe 38 is produced in the direction of its width, i.e. in the horizontal direction in the present case, by one of the lighting elements 54 in each case. Now, should a defect 88*a* or 88*b* be situated, perchance, at the transition or the boundary between a bright stripe 36 and a dark stripe 38, it may be the case that the difference in the visually perceivable test patterns 32 is so small that an inspector does not notice the distortions and hence the surface defects 88*a*, 88*b*.

This can be counteracted by virtue of each bright stripe 36 and each dark stripe 38 being defined in terms of its width by two immediately adjacently arranged lighting elements 54 in each case, as shown in FIGS. 8A, 8B and 8C. Then, a movement of the test pattern 32 is obtained by the bright stripes 36 and dark stripes 38 respectively only being moved by half their width by virtue of defining two groups of lighting elements 54*a* and 54*b* that are nested in one another, with lighting elements 54*a* and 54*b* being arranged immediately adjacently in each case. In FIGS. 8A, 8B and 8C, respectively two of the lighting elements 54*a* and 54*b* are provided with reference signs. Then, the groups of lighting elements 54*a* and 54*b* are respectively actuated in alternating fashion such that the respective lighting elements 54a, 54b which produce a bright stripe 36 before the switchover then produce a dark stripe 38, and vice versa. From FIG. 8A to FIG. 8B, only the lighting elements 54a were switched over and the lighting elements 54b remained unchanged. Then, from FIG. 8B to FIG. 8C, the lighting elements 54b were switched over, whereas the lighting elements 54a remained unchanged.

Even for the case that a defect 88a or 88b is situated at the boundary between the lighting stripes produced by two adjacent lighting elements 54a, 54b, the relevant defect 88a, 88b is always acted upon completely by a bright stripe 36 at one point and completely by a dark stripe 38 at one point.

If the available lighting means 56 are actuated instead of the lighting elements 54 for producing a test pattern 32 with a finer resolution, what was explained above in relation to the test pattern 32 and the surface defects 88a, 88b with respect to the lighting elements 54 applies correspondingly analogously with reference to the lighting means 56.

In principle, the width of the bright stripes 36 and of the dark stripes 38 can be adjusted by an appropriate actuation of the lighting elements 54 or the available lighting means 56. Stripe patterns 34, in which the bright stripes 36 and the dark stripes 38 have different widths or else in which various bright or dark stripes 36, 38 have different widths, are also possible.

Other test patterns 32 than the vertical stripe pattern 34, explained in an exemplary manner, may also be expedient, depending on the object 12 to be tested or the possible surface defects. By way of example, surface defects with elevations often can be identified better with horizontal stripes since this casts a clearer shadow for the observer. Therefore, it is for example also possible to use test patterns with horizontal or diagonal stripes, checkerboard patterns or the like. Points, ovals or other luminous areas with dark regions arranged therebetween can also form a test pattern. The structure of the test pattern can become finer as the number of installed lighting means 56 increases.

As a rule, an inspector inspects individual surface regions 16 of the vehicle bodies 14 in a certain work zone of the test chamber 18. In a different concept, the inspector accompanies the vehicle body 14 through the whole test chamber, running next to the vehicle body 14 in the process. This may be less tiring for the member of staff than inspecting different surfaces in different colors with quicker changeovers.

Figure 9:
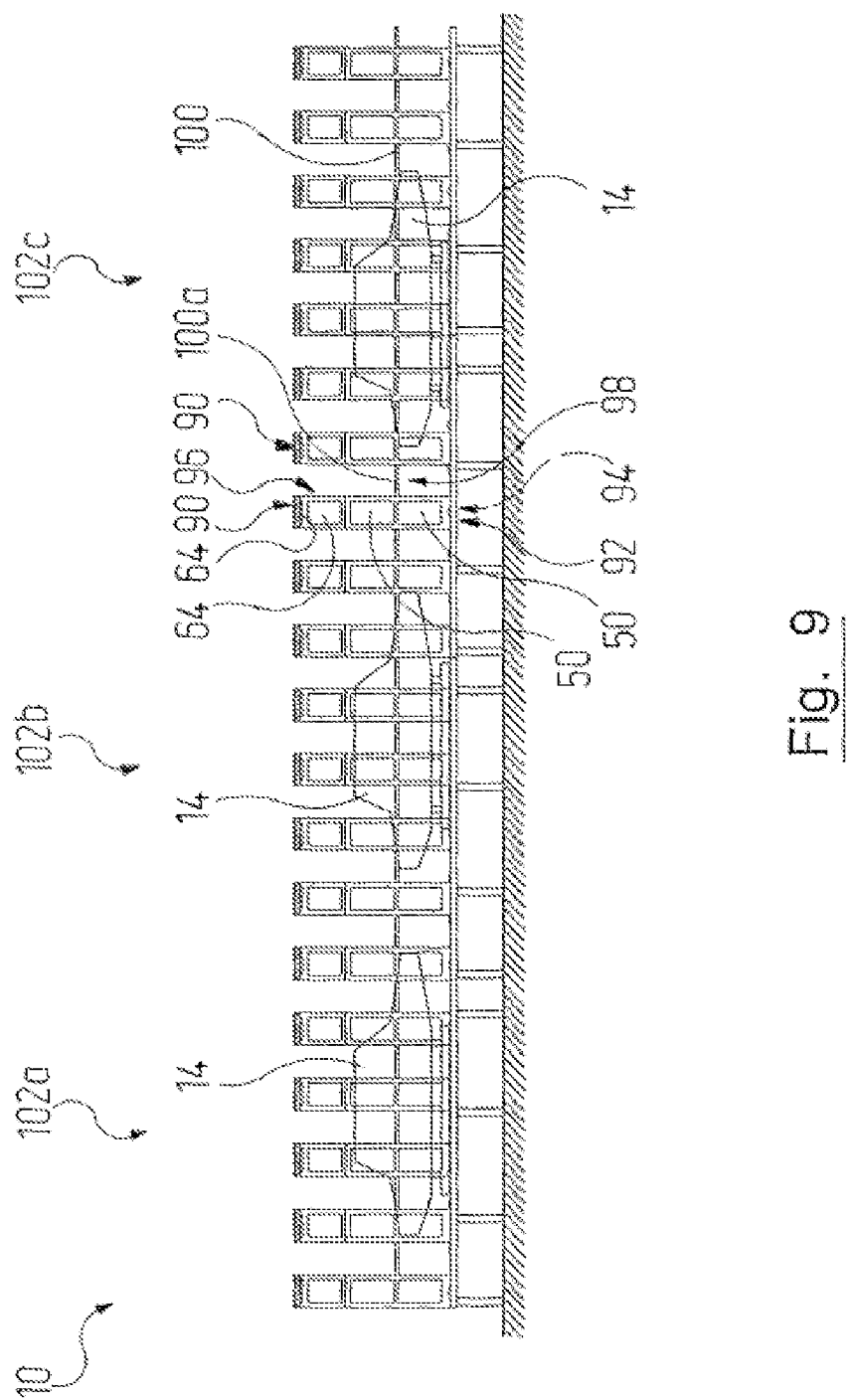
FIG. 9 shows a longitudinal section of a modified installation, in which the test-light apparatus comprises a plurality of illumination portals which are arranged in a distance-maintaining manner in the longitudinal direction of the test chamber.

As a further exemplary embodiment, FIG. 9 elucidates an installation 10 in which the test-light apparatus 28 comprises a plurality of test-light portal modules 90 which in each case carry lighting units 50 and 64 as side lighting units 92 and 94 and as a ceiling lighting unit 96. The side lighting units 94 cannot be identified on account of the section and are therefore indicated by way of a dashed reference sign line. The test-light portal modules 90 are arranged in succession in such a way that an interstice 98 remains between two test-light portal modules 90. In FIG. 9, only two test-light portal modules 90 and the interstice 98 therebetween have been provided with a reference sign.

The interstices 98 facilitate an access into the test chamber 18, with the passages formed thus being blocked by a railing 100 for safety reasons, said railing having movable door segments 100a, only one of which being provided with a reference sign.

In this installation 10, the vehicle body 14 can successively pass through various test zones; FIG. 9 shows three such test zones 102a, 102b, 102c, in which, for example, it is possible to inspect, in succession, the roof, the front part and the rear part of a vehicle body 14 in a test sequence.

Each test-light portal module 90 comprises its dedicated lighting units 50 and 64 such that the length of the resultant test chamber 18 can be adapted to the local requirements by virtue of individual test-light portal modules 90 being complemented or removed. To this end, each test-light portal module 90 is provided with connection elements for lines for required operating means, such as electrical power or work media. By way of example, purging liquids, in particular purified water, and pressurized air come into question as work media. Suitable termination elements for media that are to be conducted through in a circuit are assigned to the last test-light portal module 90 in the test chamber 18. In the case of a reconfiguration, such termination elements are transferred in each case to the last test-light portal module 90 in the test chamber 18. Control lines for control signals may also be lines that can be interconnected by way of suitable connection elements. In this way, the required operating means can be fed at the start of the test chamber 18 and can then reach all modules. To this end, plug-in connectors are available in practice, and so no further line extensions are necessary. As a consequence, two test-light portal modules 90 can be interconnected from an operational and control point of view.

If a plurality of test-light portal modules 90 are combined, the respective side lighting units 92 and 94 thereof together form the side lighting devices 44 or 46 and the ceiling lighting units 98 thereof together form the ceiling lighting device 48 of the installation 10.

In principle, the installation 10 can be designed in such a way that the lighting units 50, i.e. the lighting panels 52 in this case, of the side lighting devices 44, 46 and the lighting units 64, i.e. the lighting panels 66 in this case, of the ceiling lighting device 48 have the same construction. In this case, only a single type of lighting panel needs to be stored in situ for maintenance purposes; a defective lighting panel 52 or 66 can then be replaced as a type of uniform module. Expressed in general, the installation 10 has at least a first lighting device, here in the form of one of the two side lighting devices 44 or 46 or in the form of the ceiling lighting device 48, and a second lighting device, here, then, in the form of the other side lighting device 46 or 44 or the ceiling lighting device 48, provided these have not already been defined as the first lighting device.

As a result of the low-glare light effect of the homogeneous lighting surfaces of the lighting panels 52, 66, great ergonomics of the workstation in the test chamber 18 are ensured as the workers active there become tired less quickly than in the case of other light sources.

The invention claimed is:

1. An installation for the optical inspection of surface regions, the installation comprising:
   a) a test-light apparatus whereby objects situated in a test region can be exposed to a test light and whereby a test pattern is producible on a surface region; and
   b) a lighting system comprising a plurality of lighting units, the lighting system configured to emit the test light, wherein the plurality of lighting units are respectively embodied as a lighting panel with a plurality of lighting elements, and wherein at least one of the plurality of lighting elements comprises a plurality of lighting means configured to be activated and deactivated independently of each other,
   wherein a light intensity of the test light or both a light color and the light intensity of the test light is/are adjustable via the plurality of lighting units, wherein the test pattern is configured to be visually identifiable by a user without the use of a computer,
wherein the test pattern includes a stripe pattern made of alternately arranged bright stripes and dark stripes, and
wherein the width of the bright stripes and the dark stripes can be adjusted by actuation of the lighting system.

2. The installation as claimed in claim 1, wherein the plurality of lighting units are comprised by a side lighting device wherein the plurality of lighting units flank the test region, or are comprised by two side lighting devices wherein the plurality of lighting units flank the test region on both sides.

3. The installation as claimed in claim 2, wherein the plurality of lighting units of a side lighting device are arranged in at least two rows, which extend above one another in a vertical direction.

4. The installation as claimed in claim 2, further comprising lighting units of a ceiling lighting device wherein the lighting units of the ceiling lighting device are arranged above the test region.

5. The installation as claimed in claim 4, wherein the lighting units of the ceiling lighting device are arranged in a row or in two rows arranged next to one another and in two rows flanking the latter, which are arranged in a portal-type fashion above the test region.

6. The installation as claimed in claim 5, wherein the lighting units of the flanking rows of the ceiling lighting device are inclined in relation to a horizontal plane.

7. The installation as claimed in claim 1, wherein at least one lighting means of the plurality of lighting means is a light-emitting diode (LED) lighting means.

8. The installation as claimed in claim 7, wherein the at least one LED lighting means comprises a white LED and a yellow LED.

9. The installation as claimed in claim 8, wherein the at least one LED lighting means further comprises an RGB LED having a red LED, a green LED and a blue LED.

10. The installation as claimed in claim 1, wherein the test pattern and the object are movable relative to one another.

11. The installation as claimed in claim 10, further comprising a conveyor system configured having a conveyor to move the object.

12. The installation as claimed in claim 11, wherein the plurality of lighting units are actuable by a control system such that a test pattern is producible, the test pattern moving over or moving on the surface region, which remains stationary.

13. A lighting system for an installation as claimed in claim 1, the lighting system having at least one first and one second lighting device, wherein the first lighting device and the second lighting device comprise lighting units, wherein the lighting units are of identical construction.

14. A test-light module for constructing an installation as claimed in claim 1 and having at least one lighting unit, wherein the test-light module comprises at least one connection element for at least one line for an operating means such that a first test-light module can be connected from an operational and control point of view to a second test-light module.

15. The test-light module as claimed in claim 14, wherein the test-light module forms a portal and is a test-light portal module.

16. The installation as claimed in claim 1, wherein the surface regions of objects are surface regions of painted vehicle bodies.

* * * * *